United States Patent [19]
Curtin

[11] Patent Number: 6,097,285
[45] Date of Patent: Aug. 1, 2000

[54] AUTOMOTIVE AUDITORY FEEDBACK OF CHANGING CONDITIONS OUTSIDE THE VEHICLE CABIN

[75] Inventor: Steven D. Curtin, Freehold, N.J.

[73] Assignee: Lucent Technologies Inc., Murray Hill, N.J.

[21] Appl. No.: 09/277,317

[22] Filed: Mar. 26, 1999

[51] Int. Cl.⁷ .................................................. B60Q 1/00
[52] U.S. Cl. .................... 340/436; 340/435; 340/903; 340/384.1
[58] Field of Search .................... 340/436, 435, 340/903, 901, 904, 941, 942, 943, 384.1; 180/167, 169, 271, 274

[56] References Cited

U.S. PATENT DOCUMENTS

| | | | |
|---|---|---|---|
| 4,528,563 | 7/1985 | Takeuchi | 340/903 |
| 5,173,881 | 12/1992 | Sindle | 367/101 |
| 5,235,316 | 8/1993 | Qualizza | 340/436 |
| 5,347,273 | 9/1994 | Katiraie | 340/903 |
| 5,598,164 | 1/1997 | Reppas et al. | 342/70 |
| 5,680,123 | 10/1997 | Lee | 340/937 |
| 5,734,336 | 3/1998 | Smithline | 340/903 |
| 5,767,793 | 6/1998 | Agravante et al. | 340/903 |
| 5,786,772 | 7/1998 | Schofield et al. | 340/903 |
| 5,861,846 | 1/1999 | Minter | 342/443 |

*Primary Examiner*—Daniel J. Wu
*Assistant Examiner*—Sihong Huang
*Attorney, Agent, or Firm*—Stroock & Stroock & Lavan LLP

[57] ABSTRACT

A device for emitting audible signals within a vehicle compartment for notifying a driver of a vehicle of the presence of objects at predetermined locations around the vehicle. The driver is alerted to the presence of objects at predetermined sensing zones around the vehicle through the presence of audibly distinct tones corresponding to each sensing zone. Thus, an object present in any sensing zone causes a unique, audibly distinct sound to be generated within the cabin for warning the driver of the presence of a particular object.

9 Claims, 2 Drawing Sheets

AUTOMOTIVE AUDITORY FEEDBACK OF CHANGING CONDITIONS OUTSIDE THE VEHICLE CABIN

FIELD OF THE INVENTION

This invention relates to systems and methods of warning a vehicle driver of the proximity of objects in a zone around a moving vehicle.

BACKGROUND OF INVENTION

Currently, a driver driving a automobile, truck, sport utility vehicle, trailer or other motor equipped conveyance relies primarily on what can be seen through the front windshield and side windows, of the vehicle as well as rear and side view mirrors. As all drivers are aware, even utilizing the aforementioned items does not provide a complete field of view, leading to perilous blind spots within which other vehicles, people or other objects might be present unbeknownst to the driver, resulting in a high risk of accident. Presently, there are known wide angle mirrors which seek to eliminate blind spots, however, these mirrors are known to distort the field of view so as to make it difficult to accurately access the distance between the driver's vehicle and the object seen in the wide angle mirror. These devices also require that the driver's eyes be averted from looking in the direction the vehicle is going. That is, the driver needs to glance at one or more of the mirrors to gain an idea of surrounding vehicle traffic or other objects or obstacles. Additionally, the driver also relies on the use of a horn or other warning signal by another vehicle or object in a blind spot so that should the vehicle begin to move in such a way as to threaten an object in a blind spot, the object can give an audible warning signal to driver to discontinue moving in that particular direction.

There are also known bumper mounted devices which detect the presence of objects directly behind the vehicle so that when in reverse a sensor detects the presence of an object and emits a warning tone to alert the driver to the presence of an object unseen directly behind the vehicle. These devices generally provide for a tone that increases in frequency or pitch as the distance between the object and the vehicle decreases, or the tone chirps or alternates between an on and off state, the chirping or alternation increasing in frequency as the vehicle approaches the object. Such devices, however, provide no detection of objects that are behind the vehicle and off to the side, either on the driver or passenger side, and which, when the vehicle is moving forward, would commonly be identified as the traditional blind spot. Other systems exist to provide a beep or other audible signal when an object is in the driver's side blind spot, as well as in front of the vehicle, but give no directional indication.

Thus, the prior art presently possesses no solution for the problem of alerting a driver of a vehicle to the presence of, and the relative position of objects in proximity to the vehicle being driven without the use of mirrors or the like which require the driver to take his eyes from the road.

SUMMARY OF THE INVENTION

The present invention is directed to a system for alerting the driver of a moving vehicle to the presence of objects around the vehicle and at a predetermined proximity without requiring the driver to take his eyes from the road. Specifically, a vehicle equipped with the present invention would have one or more sensors distributed around the vehicle for sensing the presence of objects in a particular zone surrounding the vehicle. Such an example might be, for instance, a vehicle with four sensors for sensing objects generally to the left front, right front, left rear, and right rear of the vehicle as it is driven. Such sensors may, for example, be infrared, optical, radio frequency, radar or the like for detecting the presence of objects of a sufficient size to pose a potential threat to the integrity of the vehicle and driver. Such sensors are preferably adjustable so that the distance between the vehicle and the object can be predeterminately set to avoid the driver being alerted to objects which are at a safe distance from the vehicle. The sensors can also be adjusted, preferably to detect objects only of a particular size or shape so as to once again prevent alarming the driver in the instance where the object is small enough as to require no intervention on the part of the driver to change course.

The aforementioned sensors are connected to a processor, most commonly a microprocessor, which may or may not include a digital signal processor or other type of audio tone generator, which can generate audible tones within the range of human hearing. The processor, being connected to the sensors, receives signals from the sensors and analyzes the data to determine whether or not any of the sensed objects within the various sensed zones around the vehicle require the attention of the driver.

Assuming that a sensor indicates, or the processor determines based on sensed information, that an object is approaching or has approached the vehicle and is at a distance that is deemed to warrant the driver's attention, the processor directs the tone generator, digital signal processor or other audio tone generating mechanism to direct an audible signal to a sound emitting device in the interior cabin occupied by the driver, which sound is indicative of the position of the object relative to the vehicle.

Other features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

In one preferred embodiment, the cabin of the vehicle is equipped with multiple sound generating devices, most preferably loudspeaker of a type known in the art. These loudspeakers are positioned within the vehicle at predetermined locations which correspond to the exterior position that is being sensed by the sensor. Thus, for example, a sensor which is sensing the sensing zone corresponding to the front left side of the vehicle, would, be associated with a loudspeaker at the front left side of the interior cabin. Likewise, a loudspeaker oriented at the front right side of the cabin would be associated with the sensor that monitors a sensor zone corresponding to the front right side of the vehicle. The same would be true for the rear right and rear left of the vehicle. It will be recognized, from the teachings herein, that the loudspeakers may be oriented in more than four locations or less than four locations, depending on the orientation of the sensors. The ability to direct sound of from one of multiple loudspeakers, or to direct the sound from a particular loudspeaker so that it is audibly detected to come from a particular location, are techniques known in the art, which will require little to no explanation herein. Suffice it to say that the processor and tone generating device are both connected to the loudspeakers either directly or through necessary amplification so that the processor, based on information received from the appropriate sensor, can cause a tone to be generated and emitted by the proper loudspeaker so as to give a directional indication to the driver of an object in a predetermined zone around the vehicle.

Figure 1:
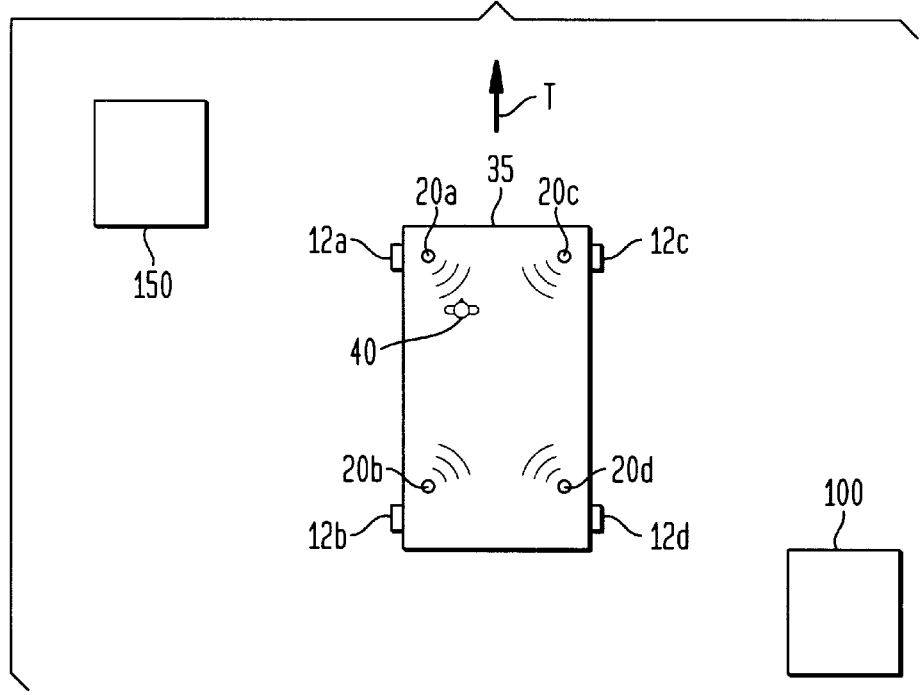
FIG. 1 is a representative top plan view of an open vehicle having sensors and sound generating devices distributed thereon in accordance with the present invention.

With initial reference to FIG. 1, there is depicted an illustrative vehicle 10 as seen from a top plan view. The front of the vehicle 35 faces in the direction of travel of the vehicle, indicated by directional arrow T. Proximate the vehicle are objects 100 and 150, respectively oriented to the right rear and left front of the vehicle. Driver 40 occupies the traditional North American driver location at the front left of the vehicle, although it will be clear from the teachings herein that the position of the driver within the vehicle cabin is simply a matter of design, and in no way limits the application of the present invention.

Situated around the vehicle, in locations on the exterior of the vehicle, or within the body and/or the interior of the vehicle depending on the sensor type, are a series of object sensors 12a, 12b, 12c and 12d. Each of the aforementioned sensors is responsible for sensing objects in a particular sensing zone. Thus, and with reference to FIGS. 1 and 3, vehicle 10 is equipped with sensor 12a for sensing objects in sensing zone 1, which corresponds to the front left quadrant of the vehicle. Sensor 12b senses objects present in sensing zone 2, which, in the present example, corresponds to the left rear side of the vehicle. Sensor 12c detects the presence of objects in sensing zone 3, which corresponds to the right front of the vehicle, and sensor 12d is responsible for sensing objects in sensing zone 4, which corresponds to the right rear of the vehicle.

Figure 3:
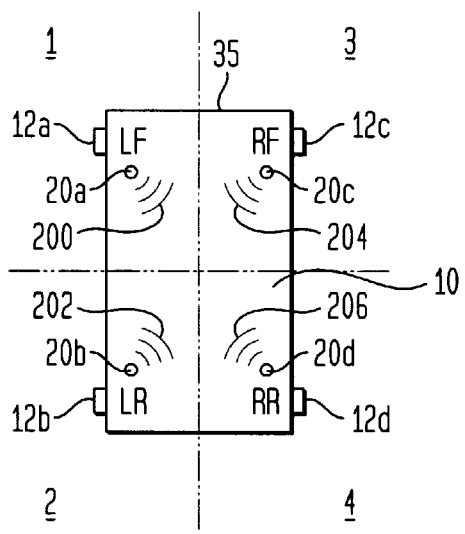
FIG. 3 is a top plan view of the vehicle depicting in FIG. 1 showing various sensor zones surrounding the vehicle.

With continual reference to FIGS. 1 and 3, assuming vehicle 10 is traveling in direction T, and is being driven by driver 40, the presence of an object 150 at the front left side of the vehicle would be detected by sensor 12a. The processor 50 which controls the system, as discussed further below, receives the signals generated by the sensors for analysis and action, and would, upon receipt of a signal from sensor 12a, analyze the signal to determine if object 150 was within a predetermined range or size limit. Assuming that object 150 met any one of a number of predetermined criteria which, by way of non-limiting example, might be speed, distance, mass, direction, or any of a combination of the above, the processor would, based on preprogrammed instructions, determine that driver 40 needed to be alerted of the presence of object 150 in sensing zone 1, corresponding to the left front of the vehicle. The processor would then cause an audible tone or other audible sound 200 to be emitting from a sound generating device 20a positioned in the interior of the vehicle at a predetermined interior position corresponding to an associated with sensor 12a, which in turn corresponds to the left front quadrant or sensor zone 1 of the vehicle. Thus, driver 40, upon hearing the alerting tone, sound, word or other audible signal emanating from sound generating device 20a at the left front position of the vehicle, would immediately recognize that an object was present in sensing zone 1, corresponding to the left front sensing zone of the vehicle. Likewise, should object 100 meet a particular set of predetermined criteria, such as those mentioned above, sensor 12d, which is responsible for sensing zone 4, would sense the presence of object 100 and such presence would be noted by system processor 50. In the presence of object 100, processor 50 would cause sound generating device 20d to emit or otherwise generate an audible tone 206 which, because of its position in the right rear portion of the interior of the cabin, would be audibly detected by driver 40 as emanating from the right rear of the vehicle cabin. Through correspondence between sensor 12d and sound generating device 12d, and through the drivers knowledge of the position of the sensing zones surrounding the vehicle, the driver 40 would understand that an object was present in sensing zone 4 requiring his or her attention. It will be noted, in both of the previous examples, that the driver did not need to take his eyes from the road ahead in order to be alerted to the presence of an object and also to be informed of the directional position of the sensed object relative to the vehicle 10 being driven.

Additionally, in yet another alternate embodiment, multiple sound generating devices or loudspeakers can be oriented around the vehicle to correspond to the sensing locations, as described above. Additionally, the sensors utilized are preferably capable of detecting the presence of more than one object in a particular sensing zone. In the event that more than one object is present in a particular sensing zone, the microprocessor can cause the tone generator or other audible tone generating device to emit two distinct tones, one per object, either sequentially or intermittently, so that the driver would hear two separate audibly distinct tones, sounds or words coming from a particular direction within the vehicle that corresponds to the sensing zone outside of the vehicle. Thus, to use a musical analogy, if two objects were sensed in the sensing zone corresponding to the front left side of the vehicle, the microprocessor might cause the musical note A to be generated, followed by the note C to be generated from the loudspeaker oriented at the front left side of the vehicle, so that the driver not only receives a directional cue from the sound but also is able to determine that there are not one but two objects in that sensing zone.

Figure 2:
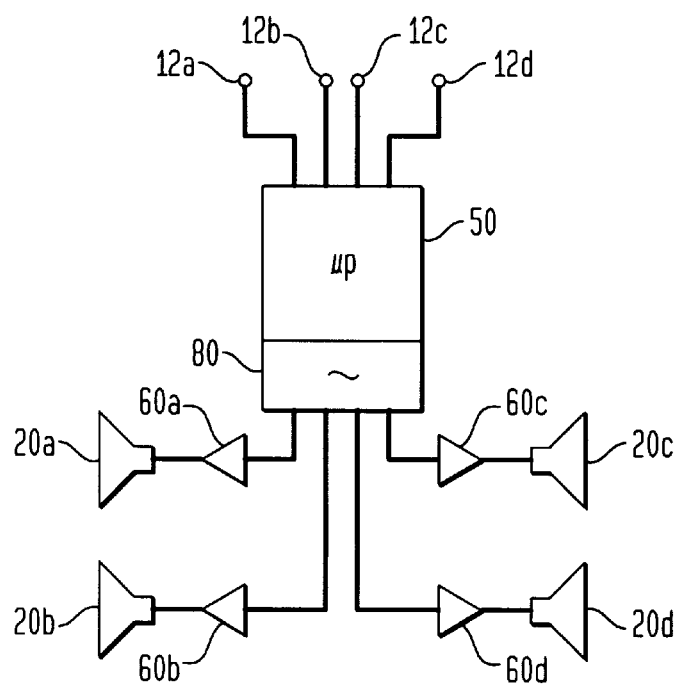
FIG. 2 is a representational block diagram of the system components making up the present invention.

As mentioned above, the system of the present invention is preferably controlled by a processor 50. With reference to FIG. 2, there is shown a microprocessor 50 to which are connected a plurality of sensors, in the present example sensors 12a, 12b, 12c and 12d, which are deployed around the vehicle as mentioned above. Connected to microprocessor 50 or as an incorporated part of processor 50, is a audio tone generating device 80 which, for example, may be an audio oscillator, sound synthesizer, digital signal processor other commonly known device for the generation of audibly detectable distinct tones, signals, sounds, notes or previously recorded spoken words or sounds. Tone generating device 80 is in turn connected to a series of sound generating devices, preferably loudspeakers, identified as 20a, 20b, 20c and 20d. These loudspeakers are deployed in various positions corresponding to the sensing zones, as described above. If necessary, amplifiers 60a through 60d may be incorporated as a part of the system to amplify the tones generated by tone generating device 80 to appropriate audible levels. Alternatively, it is contemplated that the system of the present invention might be readily incorporated into an existing audio system of an automobile, which, as presently known in the art, frequently contains at least four independently controllable loudspeakers distributed around the vehicle in the common left front, right front, left rear, and right rear configurations. Thus, it is possible that the output of the tone generating device 80 might be fed directly to an existing audio amplifier, tuner, preamplifier or other component of a presently known or preexisting audio system within the vehicle. As used therein, the term audio system within the vehicle is intended to mean any known system for sound creation within a vehicle, including am or fm radios, tape decks, CD players, minidisk players, or other commonly known in-vehicle audio entertainment system.

Additionally, processor 50 may be a separate microprocessor or other standalone computational device of a type known in the art for processing sensed signals and controlling electronic devices such as tone generators or other audio devices. Processor 50 might also be a subpart of a larger microprocessor commonly used in controlling modern day vehicles, or it may be a standalone general purpose computer or personal computer of a type known in the art, or software running on any of the aforementioned, or firmware.

Another embodiment of the invention utilizes the same sensing techniques, the generation and processor, however in the alternate embodiment requires only a single sound generating device or loudspeaker. In this alternate embodiment, each sensor has associated with it a particular tone of a particular frequency or pitch or other audible characteristic which renders it unique. That is, a uniquely identifiable audible tone is individually associated with each sensor placed around the vehicle. Thus, for example, for the sensor that monitors the front left sensing zone around the vehicle, the microprocessor could cause a unique tone to be generated that the driver would recognize, either though teaching, practice or by the driver himself setting the type of tone, is associated with the presence of objects in the front left sensing zone of the vehicle. Thus, by the way of non-limiting example, if the tones were musical notes, the front left sensing zone could correspond to the musical note A, while the front right sensing zone would cause a musical note to be generated corresponding to the note C, and likewise different musical notes selected for the rear right and rear left, if the vehicle is so equipped with sensors in those locations. Additionally, other than musical notes, unique chirping or ringing patterns or other unique sounds, including pre-recorded or synthesized words indicative of a direction, can be generated to alert the driver of the presence of an object in a particular zone surrounding the vehicle.

Figure 4:
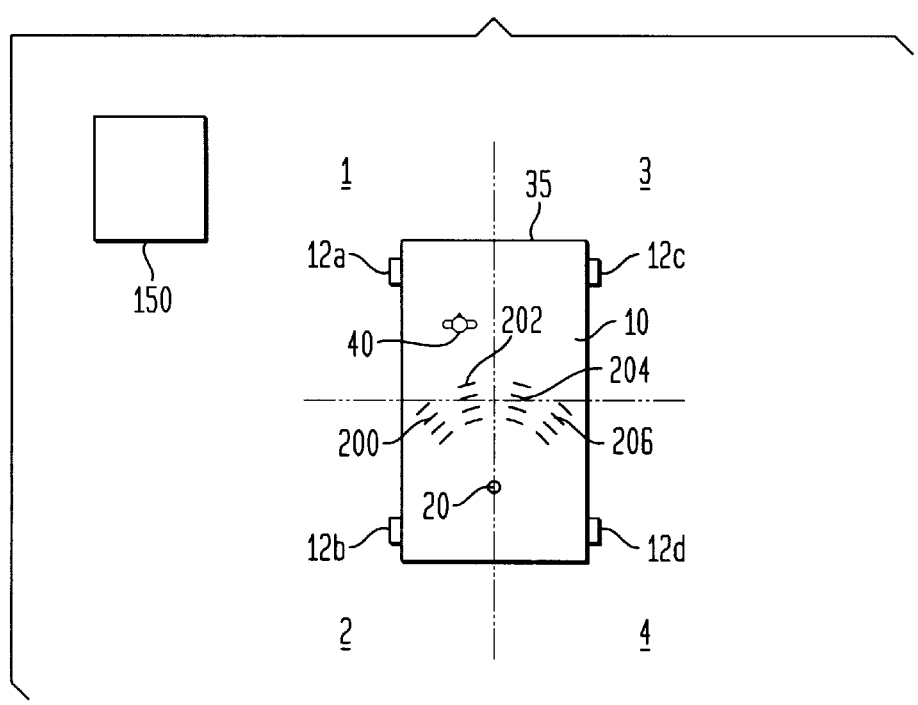
FIG. 4 is a top plan view of a vehicle configured in accordance with an alternate embodiment of the present invention.

Turning now to FIG. 4, there is shown an alternate embodiment of the present invention where a vehicle 10 is equipped with sensors 12a, 12b, 12c and 12d as described above, for sensing objects in sensing zones surrounding vehicle and for feeding information regarding sensed objects to processor 50. In this embodiment, however, only a single sound generating device or loudspeaker 20 is required. Unlike the system above, which depended on the position of multiple loudspeakers to provide an indication of direction of an object based on the direction of the sound being generated, in the instant embodiment each sensing zone surrounding the vehicle is associated with a unique audible tone or frequency or spoken word, such that no directional cue is required for driver 40 to be audibly notified of which sensing zone contains an object. Thus, with continued reference to FIG. 4, as described above, sensor 12a would be responsible for sensing the presence of an object 150 in sensing zone 1. Assuming, as described above, object 150 met certain predetermined sensing criteria, processor 50 would control the system to alert driver 40 to the presence of object 150 in sensing zone 1. In the present embodiment, each of the four exemplary sensing zones is assigned a unique frequency or audible signal to be generated by tone generator 80. Thus, in the present example, a particular unique audibly distinct tone 200 would be associated with sensing zone 1. Likewise, a separate audibly distinct tone 202 would be associated with zone 2, tone 204 with zone 3, and tone 206 with zone 4. Thus, in the absence of the directional cues via directional sound emanations, since the sound emanates from only a single source, i.e. loudspeaker 20 in the present embodiment, the driver, upon hearing audibly distinct tone 200, would through prior association, training or instruction associate audibly distinct tone 200 with the presence of an object in sensing zone 1. Each of the tones would be associated with an alternate sensing zone as described above. Thus, this embodiment is somewhat simplified in that only one sound generating device 20 is required to be deployed in the vehicle.

As mentioned above, the audible tones can be distinct sounds, combinations of sounds, or prerecorded words or signals or strings of words. Thus, in any embodiment, the audible signal might be more specific, such as a sound of a human voice saying the words "caution, front left", or any other message suitable for conveying directional information to the driver. Additionally, sound generating devices 20a through 20d, or single sound generating device 20, may be a loudspeaker, or may be a self contained source of audio tones or other sound under the direct control of processor 50. Thus, rather than one central tone generating device 80, the tone generating and sound generating function can be incorporated into a unitary structure. Also, the sensors may be mounted to the body of the car, exterior glass, lights, bumpers, or other part of the car, as appropriate for the particular sensing technology deployed. As used herein, the term sensor is used in the broadest sense, to encompass any of a number of sensing devices or technologies capable of detecting the presence of a predetermined type, size, shape or speed of object and emitting a signal representative thereof.

Additionally, processor 50 may be programmable device which can be programmed with predetermined parameters for determining whether or not to alert the driver to the presence of an object. Thus, processor 50, in concert with sensors 12a through 12d, or with any of the number of sensors utilized, as a matter of design choice, can be programmed so that only objects within a particular proximity, size, or other gating function give rise to alert. Additionally, although the system is described with multiple sensors, an individual sensor capable of discriminating between multiple objects based on any of the above described parameters of interest can be utilized, provided that microprocessor 50 is programmed to discriminate between the various signals emitted by the sensor and can translate such signals into the appropriate instructions for alerting the driver to the presence of an object in a particular sensing zone. Also, while four sensing zones are shown in the preferred embodiment, more or less than four zones may be utilized, as a matter of design choice.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A driver alert system for a moveable vehicle comprising:
  a plurality of sensors, each sensor of said plurality being placed at a respective given position and capable of detecting the presence of an object in proximity to said vehicle;
  a processor connected to said sensor for interpreting signals representative of a sensed object sent by said sensor in response to detection of an object; and
  a signaling device connected to said processor for providing an audible warning signal to a driver of said vehicle, said signaling device providing an audibly perceptible signal indicative of a directional position of said object relative to said vehicle;
  said processor determining said directional position of said object in part by determining which sensor of said plurality has detected the presence of said object;
  said signaling device including a plurality of sound generating elements, each sound generating element of said plurality being placed at a respective interior position corresponding to said respective given position of an associated sensor of said plurality of sensors;
  said signaling device further comprising an audible tone generator connected to said processor for directing an audible tone to a selected sound generating element of said plurality under the control of said processor in response to an object representative signal generated from one of said sensors of said plurality so that said driver may associate said audible tone with a directional location of said object based upon said driver perceiving said audible tone as originating from said respective interior position of said selected sound generating element and by association of said respective interior position with said given position of said sensor generating said object representative signal;
  said audible tone generator including the capability of generating a plurality of audibly distinct tones, each audibly distinct tone of said plurality being associated with a selected one sensor of said plurality so that said driver may associate the presence of each one of said distinct tones with the presence of an object detected by an associated one sensor at its said respective given position and thereby determine said directional position of said object.

2. The system of claim 1, wherein each of said plural sensors senses objects in a respective sensing zone, and wherein said sensor is capable of sensing multiple objects in said sensing zone, and wherein said processor directs an audibly distinct tone for each object sensed in said zone to said selected sound generating element so that said driver may identify the presence of multiple objects in a sensing zone by the presence of multiple respective tones originating from said respective interior position of said selected sound generating element.

3. The system of claim 2, wherein said sound generating elements are loudspeakers.

4. The system of claim 3, wherein said system connects to an automotive audio system.

5. The system of claim 1, wherein said sound generating elements are loudspeakers.

6. The system of claim 1, wherein one of said sensors is an infrared sensor.

7. The system of claim 1, wherein one of said sensors is a radar sensor.

8. The system of claim 1, wherein one of said sensors is an optical sensor.

9. A method of identifying the proximity of an object in a moving vehicle comprising the steps of:
  (a) detecting the proximity of an object by at least one of a plurality of vehicle mounted sensors mounted at a preselected location for detecting the presence of objects in a respective predetermined sensing zone;
  (b) associating each respective sensing zone with a respective distinct audible tone capable of being audibly directed into said vehicle interior by a sound generating element; and
  (c) routing a respective distinct audible tone associated with the sensing zone within which said object is sensed so that said driver may associate the presence of each one of said distinct tones with the presence of an object detected by an associated one sensor of said plurality at its said respective preselected location and thereby determine said directional position of said object.

* * * * *